US012236676B2

(12) United States Patent
Bonnevie et al.

(10) Patent No.: US 12,236,676 B2
(45) Date of Patent: Feb. 25, 2025

(54) IMAGE EXTENSION NEURAL NETWORKS

(71) Applicant: Google LLC, Mountain View, CA (US)

(72) Inventors: Mikael Pierre Bonnevie, Walnut Creek, CA (US); Aaron Maschinot, Somerville, MA (US); Aaron Sarna, Cambridge, MA (US); Shuchao Bi, Mountain View, CA (US); Jingbin Wang, Mountain View, CA (US); Michael Spencer Krainin, Arlington, MA (US); Wenchao Tong, San Jose, CA (US); Dilip Krishnan, Arlington, MA (US); Haifeng Gong, Fremont, CA (US); Ce Liu, Cambridge, MA (US); Hossein Talebi, San Jose, CA (US); Raanan Sayag, San Jose, CA (US); Piotr Teterwak, Boston, MA (US)

(73) Assignee: Google LLC, Mountain View, CA (US)

( * ) Notice: Subject to any disclaimer, the term of this patent is extended or adjusted under 35 U.S.C. 154(b) by 552 days.

(21) Appl. No.: 17/438,687

(22) PCT Filed: Jul. 19, 2019

(86) PCT No.: PCT/US2019/042509
§ 371 (c)(1),
(2) Date: Sep. 13, 2021

(87) PCT Pub. No.: WO2020/242508
PCT Pub. Date: Dec. 3, 2020

(65) Prior Publication Data
US 2022/0148299 A1 May 12, 2022

Related U.S. Application Data

(60) Provisional application No. 62/854,833, filed on May 30, 2019, provisional application No. 62/852,949, filed on May 24, 2019.

(51) Int. Cl.
G06K 9/00 (2022.01)
G06N 3/045 (2023.01)
(Continued)

(52) U.S. Cl.
CPC ............. *G06V 10/82* (2022.01); *G06N 3/045* (2023.01); *G06T 7/10* (2017.01); *G06T 2207/20132* (2013.01)

(58) Field of Classification Search
CPC . G06V 10/82; G06T 7/10; G06T 2207/20132; G06N 3/045
(Continued)

(56) References Cited

U.S. PATENT DOCUMENTS 7,154,538 B1 12/2006 Fukasawa et al.
2016/0300351 A1 10/2016 Gazit
(Continued)

FOREIGN PATENT DOCUMENTS

CN 108197525 6/2018
CN 108269245 7/2018
(Continued)

OTHER PUBLICATIONS

Lee, Dongwook, et al. "CollaGAN: Collaborative GAN for missing image data imputation." Proceedings of the IEEE/CVF conference on computer vision and pattern recognition. 2019. (Year: 2019).*
(Continued)

Primary Examiner — Jonathan S Lee
(74) Attorney, Agent, or Firm — Fish & Richardson P.C.

(57) ABSTRACT

Methods, systems, and apparatus, including computer programs encoded on a computer storage medium, for generating realistic extensions of images. In one aspect, a method comprises providing an input that comprises a provided image to a generative neural network having a plurality of generative neural network parameters. The generative neural
(Continued)

network processes the input in accordance with trained values of the plurality of generative neural network parameters to generate an extended image. The extended image has (i) more rows, more columns, or both than the provided image, and (ii) is predicted to be a realistic extension of the provided image. The generative neural network is trained using an adversarial loss objective function.

16 Claims, 8 Drawing Sheets

(51) Int. Cl.
*G06T 7/10* (2017.01)
*G06V 10/82* (2022.01)

(58) Field of Classification Search
USPC .......................................................... 382/158
See application file for complete search history.

(56) References Cited

U.S. PATENT DOCUMENTS

| | | |
|---|---|---|
| 2017/0365038 A1 | 12/2017 | Denton et al. |
| 2018/0204111 A1 | 7/2018 | Zadeh et al. |
| 2018/0349526 A1 | 12/2018 | Atsmon et al. |
| 2019/0122072 A1 | 4/2019 | Cricri et al. |
| 2019/0147333 A1 | 5/2019 | Kallur Palli Kumar et al. |
| 2021/0089903 A1* | 3/2021 | Murray ............... G06F 18/2132 |

FOREIGN PATENT DOCUMENTS

| | | |
|---|---|---|
| CN | 108875510 | 11/2018 |
| CN | 109360232 | 2/2019 |
| JP | 2015-041138 | 3/2015 |
| JP | 2016-224821 | 12/2016 |
| JP | 2018-110011 | 7/2018 |
| JP | 2019-079114 | 5/2019 |
| WO | WO 2019/037487 | 2/2019 |

OTHER PUBLICATIONS

Notice of Allowance in Japanese Appln. No. 2021-558609, dated Mar. 20, 2023, 5 pages (with English translation).
Che et al., "How is gaze influenced by image transformations? dataset and model." submitted on Mar. 2019, arXiv: 1905.06803v4, 14 pages.
International Search Report and Written Opinion in International Appln. No. PCT/US2019/042509, dated Feb. 17, 2020, 18 pages.
Liu et al., "Conditional image generation using feature-matching GAN." 2017 10th International Congress on Image and Signal Processing, BioMedical Engineering and Informatics (CISP-BMEI). IEEE, Oct. 2017, 5 pages.
Office Action in European Appln. No. 19749105.3, dated Oct. 4, 2021, 10 pages.
Office Action in Indian Appln. No. 202127042253, dated Mar. 29, 2022, 6 pages (with English translation).
Office Action in Japanese Appln. No. 2021-558609, dated Dec. 19, 2022, 6 pages (with English translation).
Office Action in European Appln. No. 19749105.3, mailed on Aug. 18, 2023, 15 pages.
Abadi et al., "Tensorflow: A system for large-scale machine learning," 12th USENIX Symposium on Operating Systems Design and Implementation (OSDI '16), Nov. 2-4, 2016, 21 pages.
Abu-El-Haija et al., "Youtube-8m: A large-scale video classification benchmark," arXiv preprint arXiv:1609.08675, Sep. 27, 2016, 10 pages.
Agarwala et al., "Panoramic video textures," In ACM Transactions on Graphics, Jul. 2005, vol. 24, pp. 821-827.
Arjovsky et al., "Wasserstein GAN," arXiv preprint arXiv:1701.07875, Jul. 17, 2017, 10 pages.
Avidan and Shamir, "Seam carving for content-aware image resizing," In ACM Transactions on graphics, Jul. 29, 2007, vol. 26, 10 pages.
Ballester et al., "Filling-in by joint interpolation of vector fields and gray levels," IEEE Transactions on Image Processing, Aug. 2001, 10(8):1-22.
Barnes et al., "Patchmatch: A randomized correspondence algorithm for structural image editing," In ACM Transactions on Graphics, Aug. 2009, vol. 28, p. 24.
Bertalmio et al., "Image inpainting," In Proceedings of the 27th Annual Conference on Computer Graphics and Interactive Techniques, Jul. 1, 2000, pp. 417-424.
Brock et al., "Large scale GAN training for high fidelity natural image synthesis," arXiv preprint arXiv:1809.11096, Sep. 28, 2018, 35 pages.
Clevert et al., "Fast and accurate deep network learning by exponential linear units," arXiv preprint arXiv:1511.07289, Nov. 23, 2015, 14 pages.
Danihelka et al., "Associative long short-term memory," In International Conference on Machine Learning, Jun. 2016, pp. 1986-1994.
Deng et al., "Imagenet: A large-scale hierarchical image database," In 2009 IEEE Conference on Computer Vision and Pattern Recognition, Jun. 20, 2009, pp. 248-255.
Dingma and Ba, "Adam: A method for stochastic optimization," arXiv preprint arXiv:1412.6980, Dec. 22, 2014, 15 pages.
Efros and Freeman, "Image quilting for texture synthesis and transfer," In Proceedings of the 28th Annual Conference on Computer Graphics and Interactive Techniques, Aug. 2001, pp. 341-346.
Efros and Leung, "Texture synthesis by non-parametric sampling," In Proceedings of the seventh IEEE International Conference on Computer Vision, Sep. 20, 1999, vol. 2, pp. 1033-1038.
Heusel et al., "GANs trained by a two time-scale update rule converge to a local nash equilibrium," In Advances in Neural Information Processing Systems, 2017, pp. 6626-6637.
Iizuka et al., "Globally and Locally Consistent Image Completion," ACM Transactions on Graphics, Jul. 2017, 36(4):107:1-107:14.
International Preliminary Report on Patentability in International Appln. No. PCT/US2019/042509, dated Nov. 16, 2021, 11 pages.
Ioffe and Szegedy, "Batch normalization: Accelerating deep network training by reducing internal covariate shift," arXiv preprint arXiv:1502.03167, Jun. 2015, 9 pages.
Jiang et al., "Spatially constrained generative adversarial networks for conditional image generation," Cornell University Library, May 7, 2019, 20 pages.
Johnson et al., "Perceptual losses for real-time style transfer and super-resolution," In European Conference on Computer Vision, Oct. 8, 2016, pp. 694-711.
Kaneva et al., "Infinite images: Creating and exploring a large photorealistic virtual space," Proceedings of the IEEE, May 27, 2010, 98(8):1391-1407.
Kingma and Welling, "Auto-encoding variational bayes," arXiv preprint arXiv:1312.6114, Dec. 20, 2013, 14 pages.
Kopf et al., "Quality prediction for image completion," ACM Transactions on Graphics, Nov. 1, 2021, 31(6):1-8.
Ledig et al., "Photo-realistic single image super-resolution using a generative adversarial network," In Proceedings of the IEEE Conference on Computer Vision and Pattern Recognition, 2017, pp. 4681-4690.
Li et al., "MisGAN: Learning from incomplete data with generative adversarial networks," Cornell University Library, Feb. 25, 2019, 20 pages.
Lim and Ye, "Geometric GAN," arXiv preprint arXiv:1705.02894, May 8, 2017, 17 pages.
Liu et al., "Image inpainting for irregular holes using partial convolutions," In Proceedings of the European Conference on Computer Vision, 2018, pp. 85-100.
Maas et al., "Rectifier nonlinearities improve neural network acoustic models," Computer Science Department, Stanford University, Jun. 16, 2013, 30(1):1-6.
Miyato and Koyama, "cGANs with projection discriminator," arXiv preprint arXiv:1802.05637, Feb. 15, 2018, 21 pages.

(56) References Cited

OTHER PUBLICATIONS

Miyato et al., "Spectral normalization for generative adversarial networks," arXiv preprint arXiv:1802.05957, Feb. 16, 2018, 26 pages.
Pathak et al., "Context encoders: Feature learning by inpainting," IEEE Conference on Computer Vision and Pattern Recognition, 2016, pp. 2536-2544.
Perez et al., "Poisson image editing," ACM Transactions on Graphics, Jul. 2003, 22(3):313-318.
Ronneberger et al., "Convo-lutional networks for biomedical image segmentation," In International Conference on Medical Image Computing and Computer-Assisted Intervention, Oct. 5, 2015, pp. 234-241.
Rubinstein et al., "Improved seam carving for video retargeting," In ACM transactions on graphics (TOG), Aug. 2008, vol. 27, 12 pages.
Shan et al., "Photo uncrop," In European Conference on Computer Vision, Sep. 6, 2014, pp. 16-31.
Simakov et al., "Summarizing visual data using bidirectional similarity," In 2008 IEEE Conference on Computer Vision and Pattern Recognition, Jun. 23, 2008, 8 pages.
Sivic et al., "Creating and exploring a large photorealistic virtual space," In 2008 IEEE Computer Society Conference on Computer Vision and Pattern Recognition Workshops, Jun. 23, 2008, 8 pages.
Szegedy et al., "Rethinking the inception architecture for computer vision," In Proceedings of the IEEE Conference on Computer Vision and Pattern Recognition, 2016, pp. 2818-2826.
Tran et al., "Hierarchical implicit models and likelihood-free variational inference," arXiv preprint arXiv:1702.08896, Feb. 28, 2917, 15 pages.
Ulyanov et al., "Instance normalization: The missing ingredient for fast stylization," arXiv preprint arXiv:1607.08022, Jul. 27, 2016, 6 pages.
Wang et al., "Bigger picture: data-driven image extrapolation using graph matching," ACM Transactions on Graphics, 2014, 33(6), 14 pages.
Wang et al., "Image inpainting via generative multi-col. convolutional neural networks," arXiv Preprint arXiv:1810.08771, 2018, 10 pages.
Yang et al., "High-resolution image inpainting using multi-scale neural patch synthesis," In Proceedings of the IEEE Conference on Computer Vision and Pattern Recognition, 2017, pp. 6721-6729.
Yeh et al., "Semantic image inpainting with deep generative models," In Proceedings of the IEEE Conference on Computer Vision and Pattern Recognition, 2017, pp. 5485-5493.
Yu et al., "Free-form image inpainting with gated convolution," In Proceedings of the IEEE/CVF International Conference on Computer Vision, 2019, pp. 4471-4480.
Yu et al., "Generative image inpainting with contextual attention," In Proceedings of the IEEE Conference on Computer Vision and Pattern Recognition, 2018, pp. 5505-5514.
Zhang et al., "Framebreak: Dramatic image extrapolation by guided shift-maps," In Proceedings of the IEEE Conference on Computer Vision and Pattern Recognition, 2013, pp. 1171-1178.
Zhang et al., "The unreasonable effectiveness of deep features as a perceptual metric," In Proceedings of the IEEE Conference on Computer Vision and Pattern Recognition, 2018, pp. 586-595.
Zhou et al., "Places: A 10 million image database for scene recognition," IEEE Transactions on Pattern Analysis and Machine Intelligence, 40(6):1452-1464.
Office Action in Chinese Appln. No. 201980095109.9, mailed on Jan. 21, 2024, 33 pages (with English translation).
Sabini et al., "Painting Outside the Box: Image Outpainting with GANs" CoRR, Submitted on Aug. 25, 2018, arXiv:1808.08483v1, 5 pages.
Cheng-Xian Li et al., "MisGAN: learning from incomplete data with generative adversarial networks" CoRR, Submitted on Feb. 25, 2019, arXiv:1902.09599v1, 20 pages.
Teterwak et al., "Boundless: Generative Adversarial Networks for Image Extension" CoRR, Submitted on Aug. 19, 2019, arXiv:1908.07007v1, 18 pages.
Notice of Allowance in Japanese Appln. No. 2023-068765, mailed on Mar. 25, 2024, 5 pages (with English translation).
Notice of Allowance in European Appln. No. 19749105.3, mailed on Mar. 6, 2024, 15 pages.
Office Action in Chinese Appln. No. 201980095109.9, mailed on Jul. 12, 2024, 17 pages (with English translation).
Liang, "Generative Semantic Manipulation with Contrasting GAN" CoRR, Submitted on Aug. 2017, arXiv:1708.00315v1, 12 pages.
Notice of Allowance in Chinese Appln. No. 201980095109.9, mailed on Jan. 1, 2025, 7 pages (with English translation).
Qiuping et al., "Conditional Generative Adversarial Network Based on Image Semantic Annotation of Cloud Model" Pattern recognition and human intelligence, vol. 31 (4), Apr. 2018, 379-388 (with English abstract).

* cited by examiner

IMAGE EXTENSION NEURAL NETWORKS

CROSS-REFERENCE TO RELATED APPLICATION

This application is a National Stage Application under 35 U.S.C. § 371 and claims the benefit of International Application No. PCT/US2019/042509, filed Jul. 19, 2019, which claims priority to U.S. Application No. 62/854,833, filed May 30, 2019 and U.S. Application No. 62/852,949, filed May 24, 2019, the disclosures of which are incorporated herein by reference.

BACKGROUND

This specification relates to processing images using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a transformation to a received input to generate an output.

SUMMARY

This specification describes a system implemented as computer programs on one or more computers in one or more locations that performs image extension.

According to a first aspect there is provided a method performed by one or more data processing apparatus, the method comprising: providing an input that comprises the provided image to a generative neural network having a plurality of generative neural network parameters, wherein: the generative neural network processes the input in accordance with trained values of the plurality of generative neural network parameters to generate an extended image; the extended image has (i) more rows, more columns, or both than the provided image, and (ii) is predicted to be a realistic extension of the provided image; and the generative neural network has been trained using an adversarial loss objective function.

In this way, the additional rows and/or columns provide an extension beyond one or more of the provided image's original borders and provide a predicted realistic extension of the provided image, such as, for example preserving high-level semantic characteristics and low-level structures and textures of the provided image.

The method may comprise receiving a request for an image to be presented in a block; determining that the provided image is responsive to the request; and after generating the extended image, providing the extended image in response to the request.

The method may comprise determining that the provided image qualifies for image extension based on a size of the block differing from a size of the provided image and in response providing the input that comprises the provided image to the generative neural network.

The size of the block may specify an aspect ratio of the block.

The request may specify additional elements to be presented with the image in the block, and providing the extended image in response to the request may include overlaying the additional elements on an extended portion of the extended image.

The block may be presented alongside search results or on a third-party webpage.

The generative neural network may comprise a plurality of convolutional neural network layers.

The generative neural network may comprise a plurality of skip connections.

The generative neural network may comprise a plurality of instance normalization layers.

The input to the generative neural network may comprise: a baseline image having a same number of rows and columns as the extended image, wherein the baseline image comprises: (i) a first portion that corresponds to the provided image, and (ii) a second portion having default pixel values; and a mask image having the same number of rows and columns as the extended image, wherein the mask image identifies the first portion and the second portion of the baseline image.

The pixels in the mask image corresponding to the first portion of the baseline image may each have a first pixel value, and the pixels in the mask image corresponding to the second portion of the baseline image may each have a second pixel value that is different than the first pixel value.

The generative neural network may be jointly trained with a discriminative neural network having a plurality of discriminative neural network parameters that is configured to process a given image to generate a discriminative output characterizing a likelihood that the given image was generated using the generative neural network.

Training the generative neural network using the adversarial loss objective function may comprise processing a training input that comprises a training image using the generative neural network and in accordance with current values of the generative neural network parameters to generate a training extended image that extends the training image; generating a discriminative neural network input based on the training extended image; processing the discriminative neural network input using the discriminative neural network and in accordance with current values of the discriminative neural network parameters to generate a discriminative output characterizing a likelihood that the discriminative neural network input was generated using the generative neural network; and adjusting the current values of the generative neural network parameters based on the adversarial loss objective function, wherein the adversarial loss objective function depends on the discriminative output characterizing the likelihood that the discriminative neural network input was generated using the generative neural network.

Generating a discriminative neural network input based on the training extended image may include overwriting a portion of the training extended image corresponding to the training image with the training image.

The method may include adjusting the current values of the generative neural network parameters based on a reconstruction loss objective function that characterizes a similarity of the training extended image to a target image, wherein the training image is a cropped representation of the target image.

The discriminative neural network may be conditioned on a semantic feature representation of a target image, wherein the training image is a cropped representation of the target image.

The semantic feature representation of the target image may be determined using an intermediate output of a classification neural network by processing the target image.

The discriminative output may be based on: (i) an output of a final layer of the discriminative neural network, and (ii) a similarity measure between an intermediate output of the discriminative neural network and the semantic feature representation of the target image.

According to another aspect there is provided a system comprising one or more computers and one or more storage devices storing instructions that when executed by the one or more computers cause the one or more computers to perform the operations of the respective method of the first aspect.

According to another aspect there is provided one or more computer storage media storing instructions that when executed by one or more computers cause the one or more computers to perform the operations of the respective method of the first aspect.

Optional features of one aspect may be combined with another where appropriate. Particular embodiments of the subject matter described in this specification can be implemented so as to realize one or more of the following advantages.

The image extension system described in this specification may generate extended images (e.g., that extend input images beyond their original borders) using a generative neural network. The generative neural network is jointly trained with a "discriminative" neural network that is configured to process an input image to generate an output defining a prediction for whether the input image is (i) a "real" image, or (ii) an extended image generated by the generative neural network. To facilitate the joint training of the generative neural network and the discriminative neural network, the system can condition the discriminative neural network on semantic features corresponding to input images processed by the discriminative neural network. Conditioning the discriminative neural network in this manner can enable the system to be trained to achieve an acceptable performance level over fewer training iterations, thereby enabling the system to consume fewer computational resources (e.g., memory and computing power) during training than some conventional systems.

Some conventional in-painting systems "fill in" a portion of an image that is surrounded in all directions by original image data. In contrast, the image extension system described in this specification extends an image beyond its original borders to generate an extended image that extends the high-level semantic characteristics and low-level image structures and textures of the image. Directly applying a conventional in-painting system to perform image extension tasks can, in some cases, result in lower quality extended images than those generated by the image extension system described in this specification. For example, conventional in-painting systems may generate extended images with blurry or repetitive pixels and inconsistent semantics, whereas the extended images created by the presently described image extension system will not have the same blurry, repetitive pixel, or inconsistent semantic characteristics.

The image extension system described in this specification generates extended images that can be used for any of a variety of applications, e.g., virtual reality applications, computational photography applications, and digital component distribution applications. In digital component distribution applications, a digital component distribution system transmits digital components for presentation in blocks, e.g., alongside search results or on third-party webpages. In some cases, an image included in a digital component may have a size that prevents the image from filling a defined block, e.g., because the aspect ratio of the image and the block are different. In this situation, the image extension system described in this specification can be used for resizing the image to enable the image to fill the block, thereby enabling more efficient use of resources (in particular, more efficient use of the space available in blocks) and preventing blank spots and/or distorted image presentations in a user interface. In other words, the system described in this application enables not only the "fill in" of an image, but the extension of an image beyond its borders, which enables an image to be modified to fit multiple different sized blocks even when only a single image size is available. This reduces the number of images that need to be stored since a single image can be modified to fit in various sized blocks while retaining features of the original image. The image extension system can obviate the need to distort an image by stretching it or compressing it along certain dimensions to change the aspect ratio of the image to cause the image to fill a block. Moreover, in digital component distribution applications, some digital component providers may require that images included in digital components be presented without being distorted (e.g., by being stretched or compressed along certain dimensions).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
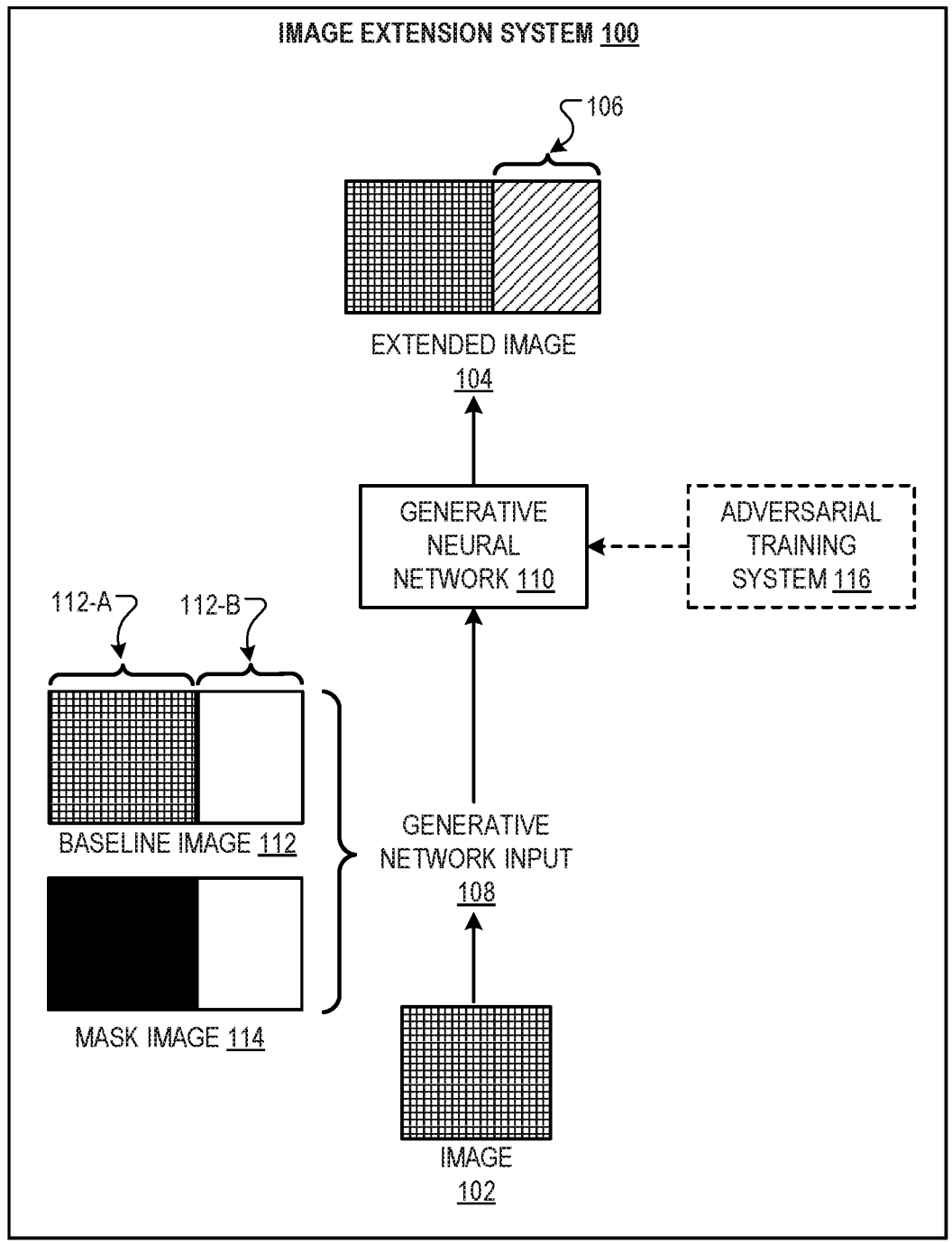
FIG. 1 shows an example image extension system.

This specification describes technology for processing an image to generate an "extended" image that realistically extends the image beyond its original borders, e.g., that extends the image beyond its original borders while preserving high-level semantic characteristics and low-level structures and textures of the image. Such processing may be used in image enhancement. For example, if an image has dimensions which do not match a block in which the image is to be placed, the image dimensions may expanded to match the block, while preserving characteristics of content within the original image. In another example, if an image is damaged, such as a portion of the image is missing, aspects of the present disclosure may be used to automatically generate the missing portion. For example, an improperly captured or a captured version of a damaged image that is incomplete can be regenerated with the techniques discussed herein.

To extend an image, the image extension system described in this specification processes the image using a generative neural network that is trained using an adversarial loss objective function to generate a corresponding extended image. The adversarial loss objective function evaluates an extended image generated using the generative neural network based on an output generated by a discriminative neural network by processing the extended image. The discriminative neural network is trained to predict whether an input image is (i) a "real" (i.e., natural) image, or (ii) an extended image generated using the generative neural network. Jointly training the generative neural network and the discriminative neural network encourages the image extension system to generate extended images that are difficult to distinguish from real images.

The image extension system can be used for any of a variety of applications, e.g., resizing images included in digital components that are to be presented in defined blocks of various dimensions to enable the images to fill the blocks without being distorted.

As used throughout this document the phrase digital component refers to a discrete unit of digital content or digital information that can include one or more of, e.g., images, video clips, audio clips, multimedia clips, text segments, or uniform resource locators (URLs). A digital component can be electronically stored in a physical memory device as a single file or in a collection of files, and digital components can take the form of video files, audio files, multimedia files, image files, or text files and include streaming video, streaming audio, social network posts, blog posts, and/or advertising information, such that an advertisement is a type of digital component. Generally, a digital component is defined by (or provided by) a single provider or source (e.g., an advertiser, publisher, or other content provider), but a digital component provided from one source could be enhanced with data from another source (e.g., weather information, real time event information, or other information obtained from another source).

These features and other features are described in more detail below.

FIG. 1 shows an example image extension system 100. The image extension system 100 is an example of a system implemented as computer programs on one or more computers in one or more locations in which the systems, components, and techniques described below are implemented.

Figure 3:
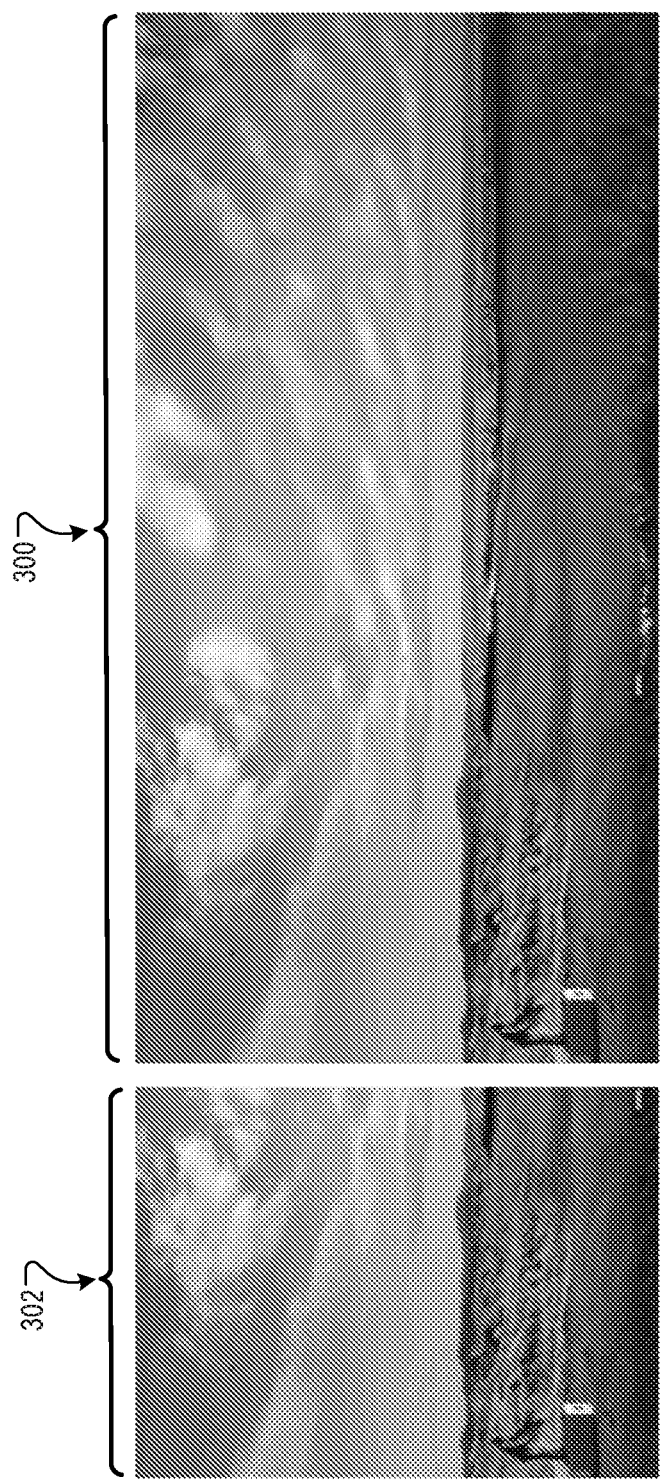
FIG. 3 is an illustration of an example of an extended image that is generated by the image extension system.

The image extension system 100 is configured to process an image 102 to generate an extended image 104 that realistically extends the image 102 beyond its original borders. More specifically, a two-dimensional (2D) array of pixels representing the extended image 104 generally has more rows, more columns, or both, than the image 102. In the example depicted in FIG. 1, the extended image 104 has one or more additional columns 106 on its right-hand side compared to the original image 102. In a particular example, the image 102 may be 100×100 dimensional, while the extended image 104 may be 100×120 dimensional. In another particular example, the image 102 may be 80×120 dimensional, while the extended image may be 90×125 dimensional. The units of the dimension may be any suitable units, such as a number of pixels. An example of an extended image generated using the system 100 is shown in FIG. 3.

In some cases, prior to generating an extended image 104, the image extension system 100 may uniformly shrink or expand the original image 102 (i.e., while preserving its aspect ratio and thereby avoiding distortions). In a particular example, to generate an output image with dimensionality 50×120 from an input image with dimensionality 100×200, the image extension system may first uniformly shrink the input image to dimensionality 50×100, and then generate an extended image with dimensionality 50×120 from the shrunken image of dimensionality 50×100.

The image 102 (and the extended image 104) can be represented in any appropriate format, e.g., as a 2D array of pixels that are each associated with a corresponding grayscale intensity or with a color vector representing the color of the pixel in an appropriate color space. The color space may be, e.g., a red-green-blue (RGB) color space or a CIELAB color space.

To generate the extended image 104, the system 100 determines a generative network input 108 from the image 102 and processes the generative network input 108 using a generative neural network 110. A few examples of generative network inputs follow.

In one example, the generative network input 108 includes a baseline image 112 and a mask image 114 that both have the same dimensionality (i.e., number of rows and columns) as the extended image that is to be generated by the generative neural network 110. The baseline image 112 includes: (i) a first portion 112-A that corresponds to the image 102, and (ii) a second portion 112-B having default pixel values (e.g., black or white pixel values). That is, the baseline image 112 includes the image 102, and can be understood to extend the image 102 by one or more rows or columns of default pixel values. The mask image 114 identifies which portions of the baseline image correspond to: (i) the image 102, and (ii) the default pixel values. For example, the pixels in the mask image 114 corresponding to the proper subset of the baseline image 112 that matches the image 102 may have a first value (e.g., the value 0), and the remaining pixels in the mask image 114 may have a second value (e.g., the value 1). In this example, the baseline image 112 and the mask image 114 may be spatially concatenated channel-wise to form the generative network input 108.

In another example, the generative network input 108 may include only the baseline image 112, i.e., without the mask image 114.

In another example, the generative network input 108 may directly correspond to the image 102, i.e., without including either the baseline image 112 or the mask image 114.

The generative neural network 110 is configured to process the generative network input 108 in accordance with trained values of a set of generative neural network parameters to generate the extended image 104. The generative neural network 110 generally has a convolutional neural network architecture, that is, a neural network architecture that includes one or more convolutional neural network layers (and optionally, other appropriate sorts of neural network layers).

The adversarial training system 116 is configured to determine trained values of the generative neural network parameters that enable the generative neural network 110 to generate realistic extended images 104. The adversarial training system 116 jointly trains the generative neural network 110 along with a discriminative neural network using an adversarial loss objective function, as will be described in more detail with reference to FIG. 2.

In some cases, the system 100 can create "panoramic" extended images by repeatedly extending an original image. For example, the system 100 can extend an original image to generate a first extended image, then extend a cropped portion of the first extended image to generate a second extended image, and so on. Finally, the system can concatenate the extended images to generate a panoramic image that substantially extends the original image, e.g., by a factor of 2×, 3×, 5×, or any other appropriate factor.

The extended images 104 generated by the system 100 can be used in any of a variety of applications. A few examples follow.

In one example, in virtual reality applications, it is sometimes necessary to simulate an image that is captured from a different camera orientation than was actually used to capture an original image. The image extension system 100 can be used to simulate an image in this manner by filling in content outside of the bounds of the original image.

In another example, in panorama stitching applications (e.g., where multiple images are "stitched" together to generate a single combined image), some conventional techniques require cropping the jagged edges of stitched projections to achieve a rectangular panorama. The image extension system 100 can obviate the need to crop jagged edges by generating extended images that fill in the gaps between the jagged edges instead, thereby enabling more effective panorama stitching.

In another example, the image extension system 100 can be used to enable videos that are captured filmed at a certain aspect ratio to be displayed on a screen with a different aspect ratio without resorting to stretching or cropping. In particular, the image extension system 100 can be used to process each video frame in a video to generate a corresponding extended video frame, e.g., having the same aspect ratio as the screen where the video is to be displayed.

In another example, the image extension system 100 can be used by a digital component distribution system to extend images that are to be displayed in defined blocks alongside search results or on third-party websites to enable the images to fill in the blocks without resorting to stretching or cropping. Using the image extension system 100 as part of a digital component distribution system is described in more detail with reference to FIG. 4.

Figure 2:
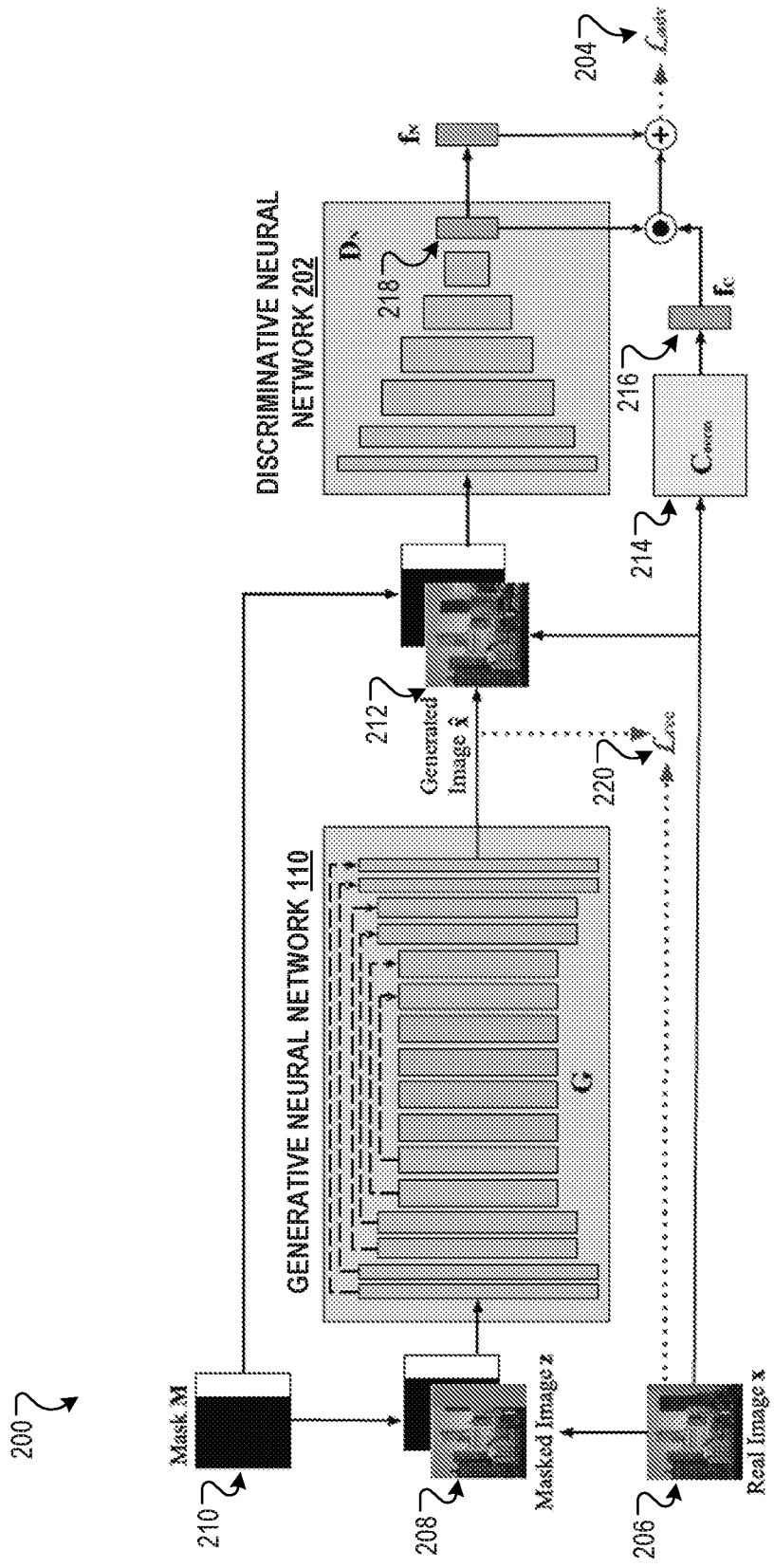
FIG. 2 illustrates an example data flow for training a generative neural network jointly with a discriminative neural network using an adversarial loss objective function.

FIG. 2 is an example data flow 200 illustrating operations that can be performed by an adversarial training system 116 for training the generative neural network 110 jointly with the discriminative neural network 202 using an adversarial loss objective function 204. Generally, the generative neural network 110 is trained to generate extended images that realistically extend input images, and the discriminative neural network 202 is trained to generate discriminative outputs characterizing the likelihood that input images were generated using the generative neural network 110 (i.e., as opposed to being natural images). Training of the generative neural network 110 will be described in detail next, followed by a description of training the discriminative neural network 202.

The generative neural network 110 is trained over multiple training iterations, and at each training iteration, the current parameter values of the generative neural network parameters are adjusted based on a current batch (i.e., set) of training examples. Each training example includes: (i) a training generative network input, and (ii) a target extended image that should be generated by the generative neural network 110 by processing the corresponding training generative network input.

The target extended images 206 included in the training examples are generally real (i.e., natural) images. The training generative network input corresponding to a target extended image 206 can be represented in any of a variety of ways, as described with reference to FIG. 1. In one example, the training generative network input corresponding to a target extended image 206 includes a baseline image 208 and a mask image 210. The baseline image 208 is generated by "masking" a portion of the target extended image 206, e.g., by setting the pixel values in a portion of the target extended image 206 to a default value (e.g., the value 0). The mask image 210 identifies the portion of the target extended image 206 that has been masked in the baseline image. The portion of the target extended image that is included in the training generative network input may be referred to in this document as a "training image".

Generally, the current batch of training examples can include multiple training examples. However, for convenience, the description which follows will reference a particular training example in the current batch.

The generative neural network 110 processes the training generative network input included in the training example to generate a corresponding training extended image 212. After generating the training extended image 212, the adversarial training system 116 processes the training extended image 212 using the discriminative neural network 202 to generate a discriminative output characterizing the likelihood that the training extended image was generated by the generative neural network 110. Thus, the discriminative output characterizes whether the training extended image 212 generated by the generative neural network 110 is a realistic image that plausibly extends the training image. As will be described in more detail below, the adversarial loss objective function 204 depends on the discriminative output generated by the discriminative neural network 202.

In some cases, rather than directly processing the training extended image 212, the adversarial training system 116 first overwrites the training image onto the corresponding portion of the training extended image 212. That is, adversarial training system 116 overwrites the training image onto the portion of the training extended image 212 that should match the training image, without modifying the portion of the training extended image 212 that extends beyond the borders of the training image. Modifying the training extended image 212 in this manner encourages the discriminative output to characterize not only whether the training extended image is inherently a realistic image, but also whether the training extended image is a realistic extension of the original training image.

Prior to the training extended image 212 being provided to the discriminative neural network 202, the mask image 210 may be spatially concatenated channel-wise to the training extended image 212.

In addition to processing the training extended image 212 (or an input based on the training extended image 212), the discriminative neural network 202 may be "conditioned" on a semantic feature representation of the target extended image 206 of the training example. That is, the discriminative output generated by the discriminative neural network 202 for the training extended image 212 may depend on the semantic feature representation of the target extended image 206.

The semantic feature representation of the target extended image 206 refers to an ordered collection of numerical values, e.g., a vector or matrix of numerical values, which implicitly or explicitly characterizes the contents of the target extended image 206. The adversarial training system 116 determines the semantic feature representation of the target extended image 206 to be an intermediate output generated by a pre-trained image processing neural network by processing the target extended image 206. An intermediate output of a neural network refers to an output generated by one or more intermediate layers of the neural network, i.e., layers following the input layer but preceding the output layer.

The image processing neural network may have any appropriate neural network architecture (e.g., an InceptionV3 architecture) and may be pre-trained to perform any of a variety of image processing tasks, e.g., classification tasks or regression tasks. In a particular example, the image processing neural network may be pre-trained to perform a classification task by generating an output characterizing respective likelihoods that an input image depicts an object from each of a predetermined number of object classes (e.g., person, vehicle, bicycle, and so on). In another particular example, the image processing neural network may be pre-trained to perform a regression task by generating an output characterizing locations of bounding boxes that are predicted to enclose objects depicted in the input image. The image processing neural network being "pre-trained" refers to the network having been previously trained to perform the image processing task.

In some cases, the adversarial training system 116 uses a normalization engine 214 to normalize the semantic representation of the target extended image prior to using it to condition the discriminative neural network 202. For example, the normalization engine 214 may determine the normalized semantic representation $C_{norm}$ as:

$$C_{norm} = \frac{C - \mathbb{E}[C]}{|C - \mathbb{E}[C]|_2} \quad (1)$$

where C is the un-normalized semantic representation, $\mathbb{E}[C]$ is the expected value of semantic representations of images (e.g., from a set of training images), and $|\cdot|_2$ refers to an $L_2$ norm. Moreover, the adversarial training system 116 may process the normalized semantic representation using one or more neural network layers 216 (e.g., fully-connected layers) that are jointly trained with the generative and discriminative neural networks prior to using the semantic representation to condition the discriminative neural network.

The discriminative neural network 202 can be conditioned on the semantic representation of the target extended image in any of a variety of ways. In one example, the adversarial training system 116 may provide the semantic representation of the target extended image as an additional input to the discriminative neural network, e.g., to an input layer or an intermediate layer of the discriminative neural network. In another example, the adversarial training system 116 may determine the discriminative output based at least in part on a similarity measure between (i) the semantic representation of the target extended image and (ii) an intermediate output of the discriminative neural network, e.g., the discriminative output D may be given by:

$$D = D_O + <D_N, S> \quad (2)$$

where $D_O$ is the scalar output of a final neural network layer of the discriminative neural network, $D_N$ is an intermediate output of the discriminative neural network (e.g., generated by intermediate layer 218), S is the semantic representation of the target extended image, and $<\cdot,\cdot>$ refers to the dot product operation.

Conditioning the discriminative neural network 202 on the semantic representation may stabilize the joint training of the generative neural network 110 and the discriminative neural network 202, and also improve the quality of extended images generated by the trained generative neural network 110. In particular, conditioning the discriminative neural network 202 on the semantic representation may enable the discriminative neural network 202 to generate a discriminative output that depends on the entire semantic content of the target extended image, including from the masked portion of the target extended image. The semantic representation may provide effective conditioning information (i.e., that enables the discriminative neural network to generate more accurate discriminative outputs) as a result of characterizing the "global" context of the target extended image. In contrast, conditioning the discriminative network directly on the pixel values of the target extended image may be less effective, e.g., because the pixel values are inherently "local" and potentially noisy. Conditioning the discriminative neural network on the semantic representation may also enable the discriminative neural network to be trained more effectively (e.g., over fewer training iterations) by reducing the burden on the discriminative neural network to directly account for semantic content in the output of its final layer. For example, referring to equation (2), the discriminative output may take the semantic content into account by an inner product between an intermediate output of the discriminative neural network and the semantic representation.

After generating the discriminative output, the adversarial training system 116 can adjust the current values of the generative neural network parameters using gradients of an objective function $\mathcal{L}_G$ that includes the adversarial loss objective function ad, 204 and a reconstruction objective function $\mathcal{L}_{rec}$ 220, e.g.:

$$\mathcal{L}_G = \mathcal{L}_{rec} + \lambda \cdot \mathcal{L}_{adv} \quad (3)$$

$$\mathcal{L}_{rec} = |x - \hat{x}|_1 \quad (4)$$

$$\mathbb{E}_{adv} = -D(\hat{x}) \quad (5)$$

where $\lambda$ is a scalar hyper-parameter, x is the target extended image, $\hat{x}$ is the training extended image generated by the generative neural network, $|\cdot|_1$ is an $L_1$ norm, and $D(\hat{x})$ is the discriminative output generated by the discriminator neural network by processing the training extended image (or an input based on the training extended image).

The objective functions characterized by equations (3)-(5) are provided as illustrative examples of objective functions, but other objective functions are possible. Generally, the reconstruction objective function $\mathbb{E}_{rec}$ can characterize the similarity between the target extended image x and the training extended image $\hat{x}$ in any of a variety of ways, and the adversarial loss objective function $\mathbb{E}_{adv}$ can depend on the discriminative output $D(\hat{x})$ in any of a variety of ways.

The adversarial training system 116 jointly trains the discriminative neural network 202 and the generative neural network 110, e.g., by alternating between training the discriminative neural network 202 and the generative neural network 110 for predetermined numbers of training iterations.

At each training iteration during training of the discriminative neural network, the current parameter values of the discriminative neural network are adjusted based on a current batch of training examples. As before, the current batch of training examples can include multiple training examples, but for convenience, the description which follows will reference a particular training example.

To train the discriminative neural network 202, the adversarial training system 116 processes the training generative network input of the training example using the generative neural network 110 to generate a corresponding training extended image. The adversarial training system 116 processes both the training extended image (or an input based on the training extended image) and the corresponding target extended image using the discriminative neural network to generate corresponding discriminative outputs. The adversarial training system 116 then adjusts the current parameter values of the discriminative neural network 202 based on a discriminative objective function that depends on the discriminative outputs generated for the training extended image and the target extended image. For example, the discriminative objective function $\mathbb{E}_{disc}$ may be given by:

$$\mathbb{E}_{disc} = \text{ReLU}(1-D(x)) + \text{ReLU}(1+D(\hat{x})) \quad (6)$$

where $\text{ReLU}(\cdot)$ is a rectified linear unit function, $D(x)$ is the discriminative output generated by the discriminative neural network for the target extended image, and $D(\hat{x})$ is the discriminative output generated by the discriminative neural network for the training extended image generated by the generative neural network. The discriminative objective function characterized by equation (6) is provided for illustrative purposes only, and other discriminative objective functions are possible.

The discriminative neural network 202 can have any appropriate neural network architecture. In one example, the discriminative neural network 202 has six strided convolutional layers with leaky ReLU activation functions followed by a fully-connected layer.

During training of the generative neural network and the discriminative neural network, the adversarial training system 116 can determine gradients of the objective functions using, e.g., backpropagation techniques. The adversarial training system 116 can use the gradients of the objective functions to adjust the current parameter values of the generative neural network and the discriminative neural network using any appropriate gradient descent optimization procedure, e.g., Adam or RMSprop.

The adversarial training system 116 can continue jointly training the generative neural network 110 and the discriminative neural network 202 until a training termination criterion is satisfied, e.g., until a predetermined number of training iterations have been performed for each neural network, or until a performance criterion is satisfied.

FIG. 3 is an illustration of an example of an extended image 300 that is generated by the image extension system 100 described with reference to FIG. 1 by processing the original image 302. It can be appreciated that the extended image 300 is a realistic extension of the original image 302 that preserves high-level semantic characteristics and low-level structures and textures of the original image 302.

Figure 4:
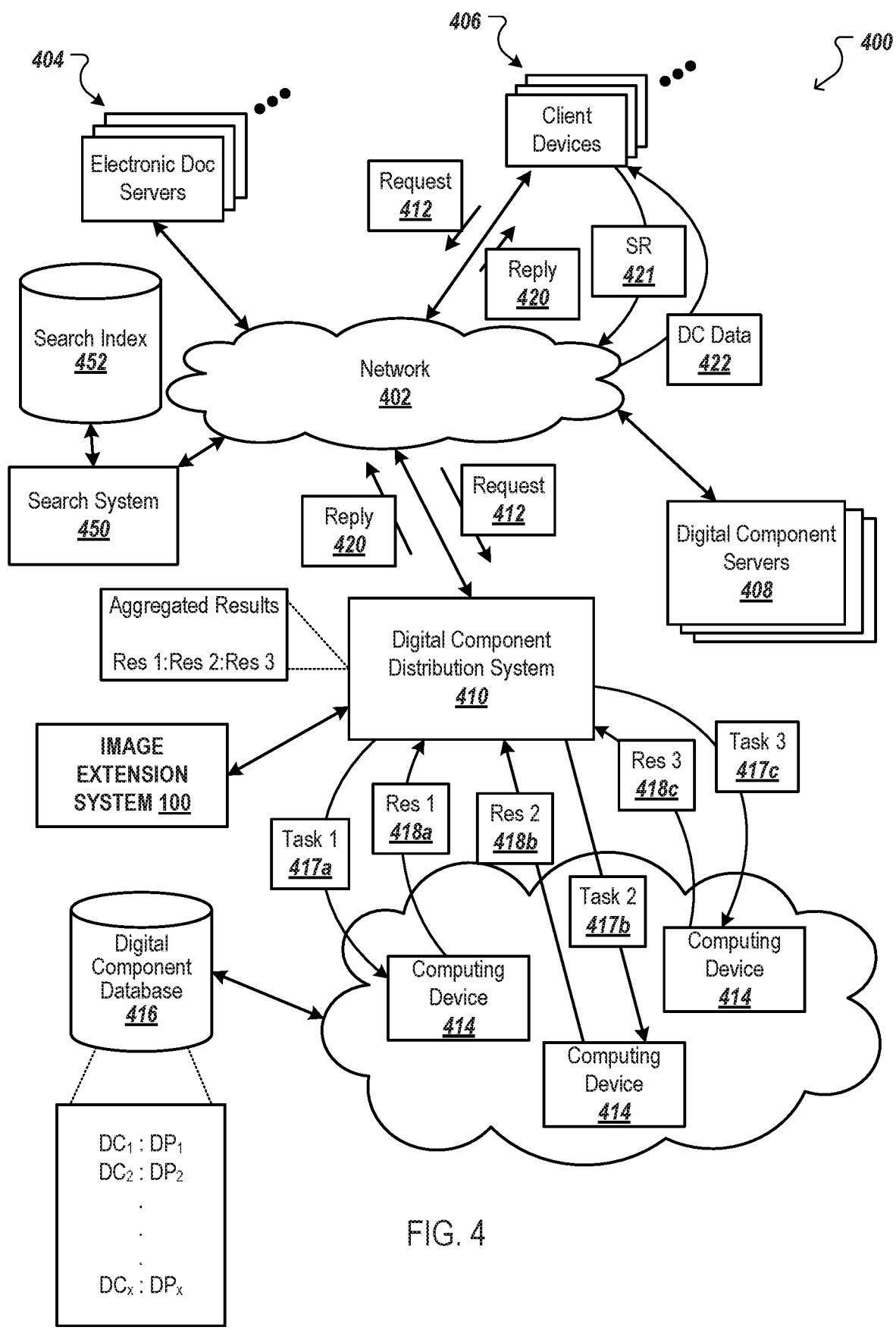
FIG. 4 is a block diagram of an example environment in which a digital component distribution system uses the image extension system.

FIG. 4 is a block diagram of an example environment 400 in which a digital component distribution system 410 uses the image extension system 100 while transmitting digital components from a digital component database 416 for presentation with electronic documents. As will described in more detail below, the digital component distribution system can transmit digital components in response to requests for digital components to be presented with electronic document at user devices, e.g., in blocks alongside search results or on third party websites.

After identifying a digital component to be transmitted in response to a request, the distribution system may identify that the image included in the digital component qualifies for image extension. In one example, the distribution system may identify that the image qualifies for image extension based on the size (e.g., aspect ratio) of the image differing (e.g., by at least a threshold amount) from the size of the block where the image will be presented. In this example, the digital component request can include data characterizing the size of the block where the digital component will be presented. In another example, the distribution system may identify that the image qualifies for image extension based on a provider of the digital component having specified that other visual elements of the digital component (e.g., text, logos, and interactive elements) should not be overlaid on the image of the digital component.

In response to identifying that the image included in the digital component qualifies for extension, the distribution system can process the image using the image extension system 100 to generate an extended image. In one example, the distribution system may generate an extended image having an aspect ratio that matches the aspect ratio of the block where the extended image will be displayed. In another example, the distribution system may generate an extended image, and then overlay the additional visual elements of the digital component (e.g., text, logos, and interactive elements) only on the extended portion of the image (i.e., without modifying the original image).

After extending the image included in the digital component, the distribution system may transmit the digital component with the extended image for presentation in a block at a user device that generated the component request.

The example environment 400 and the operations performed by the distribution system are described in more detail next.

The example environment 400 includes a network 402, such as a local area network (LAN), a wide area network (WAN), the Internet, or a combination thereof. The network 402 connects electronic document servers 404, client devices 406, digital component servers 408, and the digital component distribution system 410 (also referred to as the "distribution system" 410). The example environment 400 may include many different electronic document servers 404, client devices 406, and digital component servers 408.

A client device 406 is an electronic device that is capable of requesting and receiving resources over the network 402. Example client devices 406 include personal computers, mobile communication devices (e.g., mobile phones), and other devices that can send and receive data over the network 402. A client device 406 typically includes a user application, such as a web browser, to facilitate the sending and receiving of data over the network 402, but native applications executed by the client device 406 can also facilitate the sending and receiving of data over the network 402.

An electronic document is data that presents a set of content at a client device 406. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 406 by electronic document servers 404 ("Electronic Doc Servers"). For example, the electronic document servers 404 can include servers that host publisher websites. In this example, the client device 406 can initiate a request for a given publisher webpage, and the electronic server 404 that hosts the given publisher webpage can respond to the request by sending machine executable instructions that initiate presentation of the given webpage at the client device 406.

In another example, the electronic document servers 404 can include app servers from which client devices 406 can download apps. In this example, the client device 406 can download files required to install an app at the client device 406, and then execute the downloaded app locally.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include one or more tags or scripts that cause the client device 406 to request content from the data source when the given electronic document is processed (e.g., rendered or executed) by a client device 406. The client device 406 integrates the content obtained from the data source into the given electronic document to create a composite electronic document including the content obtained from the data source.

In some situations, a given electronic document can include one or more digital component tags or digital component scripts that reference the digital component distribution system 410. In these situations, the digital component tags or digital component scripts are executed by the client device 406 when the given electronic document is processed by the client device 406. Execution of the digital component tags or digital component scripts configures the client device 406 to generate a request for one or more digital components 412 (referred to as a "component request"), which is transmitted over the network 402 to the digital component distribution system 410. For example, a digital component tag or digital component script can enable the client device 406 to generate a packetized data request including a header and payload data. The component request 412 can include event data specifying features such as a name (or network location) of a server from which the digital component is being requested, a name (or network location) of the requesting device (e.g., the client device 406), and/or information that the digital component distribution system 410 can use to select one or more digital components provided in response to the request. The component request 412 is transmitted, by the client device 406, over the network 402 (e.g., a telecommunications network) to a server of the digital component distribution system 410.

The component request 412 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the digital component distribution system 410. Similarly, event data specifying keywords associated with the electronic document ("document keywords") or entities (e.g., people, places, or things) that are referenced by the electronic document can also be included in the component request 412 (e.g., as payload data) and provided to the digital component distribution system 410 to facilitate identification of digital components that are eligible for presentation with the electronic document. The event data can also include a search query that was submitted from the client device 406 to obtain a search results page, and/or data specifying search results and/or textual, audible, or other visual content that is included in the search results.

Component requests 412 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 412 can be transmitted, for example, over a packetized network, and the component requests 412 themselves can be formatted as packetized data having a header and payload data. The header can specify a destination of the packet and the payload data can include any of the information discussed above.

The component distribution system 410 chooses digital components that will be presented with the given electronic document in response to receiving the component request 412 and/or using information included in the component request 412. In some implementations, a digital component is selected (using the techniques described herein) in less than a second to avoid errors that could be caused by delayed selection of the digital component. For example, delays in providing digital components in response to a component request 412 can result in page load errors at the client device 406 or cause portions of the electronic document to remain unpopulated even after other portions of the electronic document are presented at the client device 406. Also, as the delay in providing the digital component to the client device 406 increases, it is more likely that the electronic document will no longer be presented at the client device 406 when the digital component is delivered to the client device 406, thereby negatively impacting a user's experience with the electronic document. Further, delays in providing the digital component can result in a failed delivery of the digital component, for example, if the electronic document is no longer presented at the client device 406 when the digital component is provided.

In some implementations, the digital component distribution system 410 is implemented in a distributed computing system that includes, for example, a server and a set of multiple computing devices 414 that are interconnected and identify and distribute digital components in response to requests 412. The set of multiple computing devices 414 operate together to identify a set of digital components that are eligible to be presented in the electronic document from a corpus of millions of available digital components (DC1-x). The millions of available digital components can be indexed, for example, in a digital component database 416. Each digital component index entry can reference the corresponding digital component and/or include distribution parameters (DP1-DPx) that contribute to (e.g., condition or limit) the distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, or terms specified in the component request 412) in order for the digital component to be eligible for presentation. In other words, the distribution parameters are used to trigger distribution (e.g., transmission) of the digital components over the network 402. The distribution parameters can also require that the component request 412 include information specifying a particular geographic region (e.g., country or state) and/or information specifying that the component request 412 originated at a particular type of client device (e.g., mobile device or tablet device) in order for the digital component to be eligible for presentation.

The distribution parameters can also specify an eligibility value (e.g., ranking score, bid, or some other specified value) that is used for evaluating the eligibility of the digital component for distribution/transmission (e.g., among other available digital components), for example, by the component evaluation process. In some situations, the eligibility value can specify a maximum amount of compensation that a provider of the digital component is willing to submit in response to the transmission of the digital component (e.g., for each instance of specific events attributed to the presentation of the digital component, such as user interaction with the digital component).

The identification of the eligible digital component can be segmented into multiple tasks 417a-417c that are then assigned among computing devices within the set of multiple computing devices 414. For example, different computing devices in the set 414 can each analyze a different portion of the digital component database 416 to identify various digital components having distribution parameters that match information included in the component request 412. In some implementations, each given computing device in the set 414 can analyze a different data dimension (or set of dimensions) and pass (e.g., transmit) results (Res 1-Res 3) 418a-418c of the analysis back to the digital component distribution system 410. For example, the results 418a-418c provided by each of the computing devices in the set 414 may identify a subset of digital components that are eligible for distribution in response to the component request and/or a subset of the digital components that have certain distribution parameters. The identification of the subset of digital components can include, for example, comparing the event data to the distribution parameters, and identifying the subset of digital components having distribution parameters that match at least some features of the event data.

The digital component distribution system 410 aggregates the results 418a-418c received from the set of multiple computing devices 414 and uses information associated with the aggregated results to: (i) select one or more digital components that will be provided in response to the request 412, and (ii) determine transmission requirements for the one or more digital components. For example, the digital component distribution system 410 can select a set of winning digital components (one or more digital components) based on the outcome of one or more component evaluation processes. In turn, the digital component distribution system 410 can generate and transmit, over the network 402, reply data 420 (e.g., digital data representing a reply) that enables the client device 406 to integrate the set of winning digital components into the given electronic document, such that the set of winning digital components and the content of the electronic document are presented together at a display of the client device 406.

In some implementations, the client device 406 executes instructions included in the reply data 420, which configures and enables the client device 406 to obtain the set of winning digital components from one or more digital component servers. For example, the instructions in the reply data 420 can include a network location (e.g., a Uniform Resource Locator (URL)) and a script that causes the client device 406 to transmit a server request (SR) 421 to the digital component server 408 to obtain a given winning digital component from the digital component server 408. In response to the request, the digital component server 408 will identify the given winning digital component specified in the server request 421 (e.g., within a database storing multiple digital components) and transmit, to the client device 406, digital component data (DC Data) 422 that presents the given winning digital component in the electronic document at the client device 406.

To facilitate searching of electronic documents, the environment 400 can include a search system 450 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 452 (e.g., hardware memory device(s)). Data that are associated with an electronic document is data that represents content included in the electronic document and/or metadata for the electronic document.

Client devices 406 can submit search queries to the search system 450 over the network 402. In response, the search system 450 accesses the search index 452 to identify electronic documents that are relevant to the search query. The search system 450 identifies the electronic documents in the form of search results and returns the search results to the client device 406 in a search results page. A search result is data generated by the search system 450 that identifies an electronic document that is responsive (e.g., relevant) to a particular search query, and includes an active link (e.g., hypertext link) that causes a client device to request data from a specified network location (e.g., URL) in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 406. In some situations, the search system 450 can be part of, or interact with, an application store (or an online portal) from which applications can be downloaded for install at a client device 406 in order to present information about downloadable applications that are relevant to a submitted search query. Like other electronic documents, search results pages can include one or more slots in which digital components (e.g., advertisements, video clips, audio clips, images, or other digital components) can be presented.

To select a digital component to be transmitted in response to a component request, the distribution system 410 may identify a set of digital components that are eligible to be transmitted in response to the component request. The distribution system 410 may then select one or more of the eligible digital components to be transmitted through, e.g., an auction procedure. In some implementations, the distribution system 410 performs an auction procedure by ranking the eligible digital components in accordance with their respective eligibility values, and selecting one or more highest-ranked digital components to be transmitted in response to the component request.

For example, the distribution system 410 may identify digital components A, B, and C as eligible to be transmitted in response to a component request. In this example, digital component A has an eligibility value of $5, digital component B has an eligibility value of $1, and digital component C has an eligibility value of $5.5, where the eligibility values of the digital components represent bids associated with the digital components. The distribution system 410 may rank (e.g., in descending order) the digital components in accordance with their respective eligibility values as: C, A. B. Finally, the distribution system 410 may select the highest ranked digital component C for transmission in response to the component request After selecting a digital component to be transmitted in response to a digital component request, the distribution system 410 determines a transmission requirement for the selected digital component. A transmission requirement specifies an action to be performed by the provider of a digital component in response to a transmission of the digital component. For example, the transmission requirement may specify that the provider of the digital component submit an amount of compensation in response to the transmission of the digital component. In some cases, the amount of compensation specifies an amount to be submitted for each instance of specific events attributed to the presentation of the digital component (e.g., user interactions with the digital component).

The distribution system 410 may determine the transmission requirement of the selected digital component based on the eligibility value of the selected digital component and/or the eligibility values of the other digital components that were determined as eligible to be transmitted in response to the component request. For example, the distribution system 410 may identify digital components A, B, and C as eligible for transmission in response to a digital component request, where A, B, and C have respective eligibility values of $5, $1, and $5.5. The distribution system 410 may select digital component C for transmission (since it has the highest eligibility value), and may determine the transmission requirement for digital component C to be the next highest eligibility value from amongst the eligibility values of the eligible digital components. In this example, next highest eligibility value is $5 (i.e., the eligibility value of digital component A), and therefore the distribution system 410 may determine the transmission requirement of digital component C to be $5.

Figure 5:
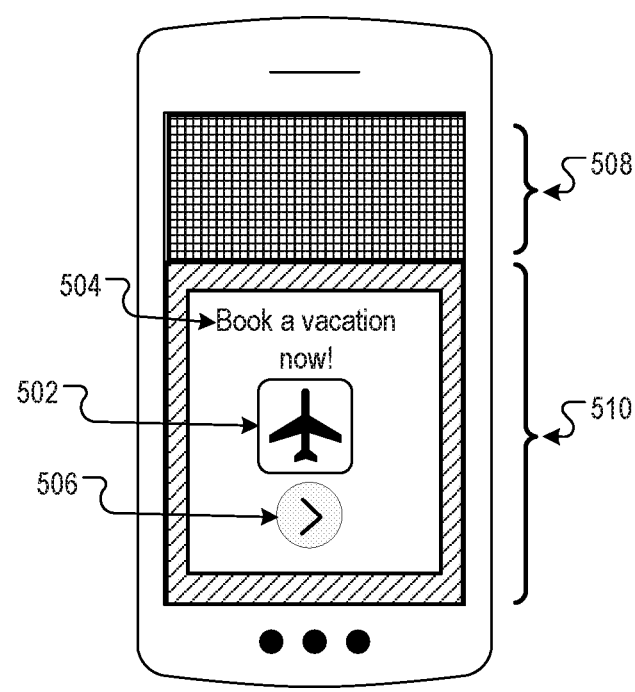
FIG. 5 shows a digital component that is being displayed on a screen of a user device, where the image included in the digital component was extended using the image extension system.

FIG. 5 shows a digital component that is being displayed on a screen of a user device, e.g., a smartphone. The digital component includes an image that fills the screen of the device and additional visual elements including a logo 502, a segment of text 504, and an interactive element 506 that overlay the image. In this example, the image includes a first portion 508 that was provided to the digital component distribution system, and a second portion 510 that was generated using the image extension system 100. After receiving a request for a digital component to be provided to the user device, the digital component distribution system generates an extended image that fills the screen of the device, and overlays the additional elements 502, 504, and 506 on the extended part 510 of the image. In this example, the "block" where the digital component is displayed corresponds to the entire screen of the user device, but the block could occupy less than all of the screen.

Figure 6:
FIG. 6 shows a digital component that is being displayed in a "banner" block, where the image included in the digital component was extended using the image extension system.

FIG. 6 shows a digital component that is being displayed in a "banner" block, e.g., along with search results or on a third party website. Similar to FIG. 6, the digital component includes an image that fills the block and additional elements 602. In this example, the image includes a first portion 604 that was provided to the digital component distribution system, and a second portion 606 that was generated using the image extension system 100. After receiving a request for a digital component to be presented in a banner block on a user device, the digital component distribution system generates an extended image that fills the block, and overlays the additional elements 602 on the extended part 606 of the image.

Figure 7:
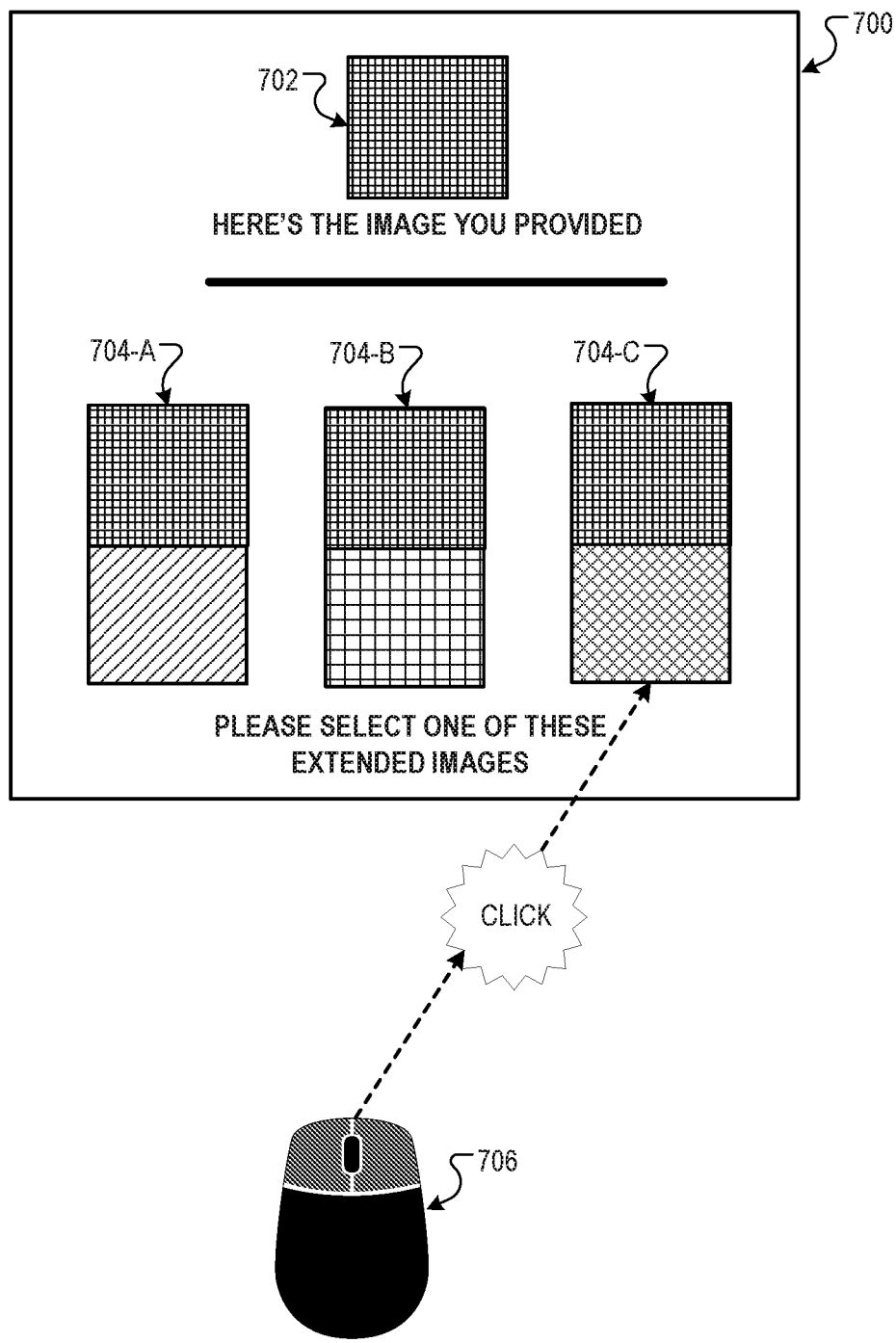
FIG. 7 is an illustration of an example user interface that can be presented to an entity that provides a digital component for transmission by a digital component distribution system.

FIG. 7 is an illustration of an example user interface 700 that can be presented to an entity (e.g., an advertiser, publisher, or other content provider) that provides a digital component for transmission by a digital component distribution system (e.g., as described with reference to FIG. 4). The user interface 700 presents an image 702 included in the provided digital component and multiple extended images 704-A-C that extend the image 702. Generally, each of the extended images 704-A-C are different as a result of being generated using different image extension procedures. For example, one of the extended images may have been generated using the image extension system described with reference to FIG. 1, while another of the extended images may have been generated using an image extension procedure based on partial differential equations (PDEs), which will be described in more detail below.

The user interface 700 prompts the provider of the digital component to select a preferred one of the extended images (e.g., that is most visually appealing to the digital component provider). The digital component provider can select a particular extended image, e.g., by clicking on particular extended image using a mouse 706 (or in any of a variety of other ways). If the distribution system later determines that the image included in the provided digital component qualifies for extension, the distribution generates the extension of the image using the image extension procedure corresponding to the particular extended image selected by the user.

Images can be extended in a variety of ways, e.g., using the image extension system described with reference to FIG. 1, or using an image extension procedure based on PDEs. In a PDE extension method, the pixel values in the extended portion of an image are identified as an (approximate or exact) solution to a PDE subject boundary conditions specified by the pixel values on a portion of the boundary of the original image. The PDE may be, e.g., a diffusion PDE, or any other appropriate PDE. The solution to the PDE subject to the boundary conditions may be obtained using any appropriate numerical technique, e.g., a finite element technique.

Figure 8:
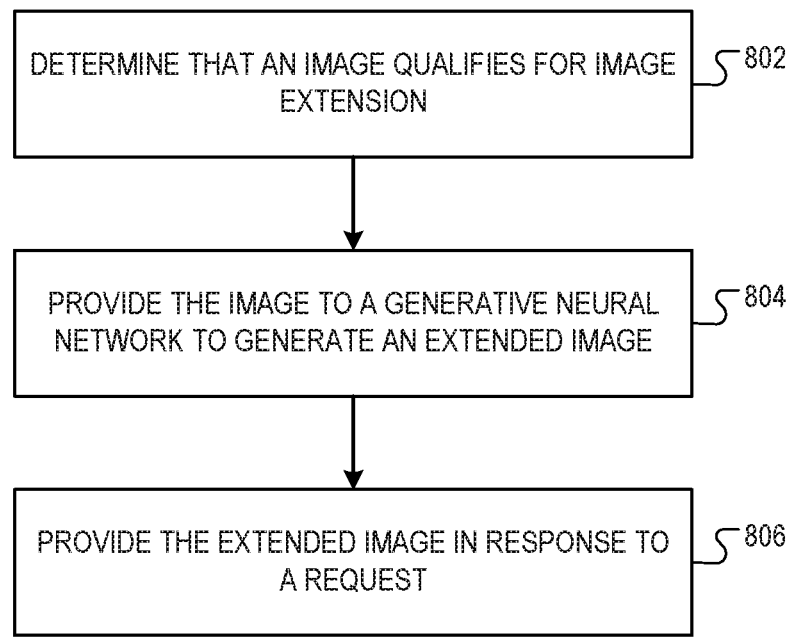
FIG. 8 is a flow diagram of an example process for providing an extended image in response to a request.

FIG. 8 is a flow diagram of an example process 800 for providing an extended image in response to a request. For convenience, the process 800 will be described as being performed by a system of one or more computers located in one or more locations. For example, a distribution system, e.g., the distribution system 100 of FIG. 1, appropriately programmed in accordance with this specification, can perform the process 800.

The system determines that a provided image qualifies for image extension (802). In one example, the system may receive a request for a digital component to be presented in a block, e.g., alongside search results or on a third party webpage, and thereafter determine that a digital component that includes the provided image is responsive to the request. In this example, the system may determine that the provided image qualifies for extension based on the size of the image differing from the size of the block, e.g., if the image and the block have different aspect ratios.

The system provides an input the includes the image to a generative neural network that processes the input in accordance with trained values of the generative neural network parameters to generate an extended image (804). The extended image has (i) more rows, more columns, or both than the provided image, and (ii) is predicted to be a realistic extension of the provided image.

The input processed by the generative neural network may include a baseline image and a mask image, both having the same number of rows and columns as the extended image. The baseline image includes: (i) a first portion that corresponds to the provided image, and (ii) a second portion having default pixel values. The mask image identifies the first portion and the second portion of the baseline image. In one example, the pixels in the mask image corresponding to the first portion of the baseline image each have a first pixel value, and the pixels in the mask image corresponding to the second portion of the baseline image each have a different second pixel value.

The generative neural network includes multiple convolutional neural network layers and can have any appropriate neural network architecture. For example, the generative neural network may include one or more skip connections, one or more instance normalization layers, or both.

The generative neural network has been jointly trained with a discriminative neural network using an adversarial loss objective function. The discriminative neural network is configured to process a given image to generate a discriminative output characterizing a likelihood that the given image was generated using the generative neural network.

The system trains the generative neural network using the adversarial loss objective function over multiple training iterations. At each training iteration, the system processes a training input that includes a training image using the generative neural network to generate a training extended image that extends the training image, and then generates a discriminative neural network input based on the training extended image. In one example, the system generates the discriminative neural network input by using the training image to overwrite the portion of the training extended image corresponding to the training image. The system processes the discriminative neural network input using the discriminative neural network to generate a discriminative output characterizing a likelihood that the discriminative neural network input was generated using the generative neural network. Thereafter, the system adjusts the current values of the generative neural network parameters based on the adversarial loss objective function, where the adversarial loss objective function depends on the discriminative output generated by the discriminative neural network.

In some cases, the training image is a cropped representation of a target image, and the discriminative neural network is conditioned on a semantic feature representation of the target image. The system may determine the semantic representation of the target image to be an intermediate output generated by a classification neural network by processing the target image. Conditioning the discriminative neural network on the semantic feature representation of the target image may include, e.g., determining the discriminative output based on a similarity measure between an intermediate output of the discriminative neural network and the semantic feature representation of the target image. The discriminative output may be additionally determined based on the output of the final layer of the discriminative neural network.

In addition to training the generative neural network using the adversarial loss objective function, the system may additionally train the generative neural network using a reconstruction loss objective function. More specifically, the system may adjust the current values of the generative neural network parameters based on a reconstruction loss objective function that characterizes a similarity of the training extended image to the target image.

The system provides the extended image in response to a request (806). In some cases, the request specifies additional elements to be presented with the image in the block, and the system overlays the additional elements on the extended portion of the extended image. After the system provides the extended image in response to the request, the extended may be, e.g., presented alongside search results or on a third-party webpage.

Figure 9:
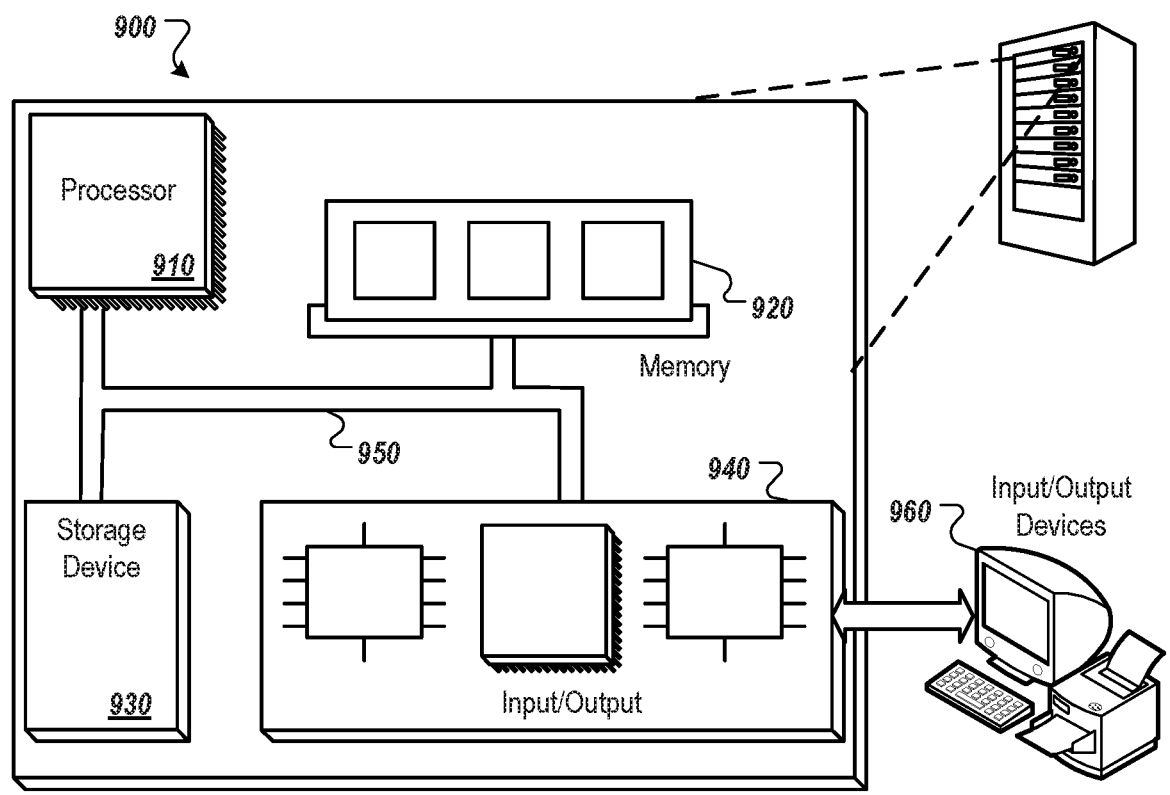
FIG. 9 is a block diagram of an example computer system.

FIG. 9 is a block diagram of an example computer system 900 that can be used to perform operations described above. The system 900 includes a processor 910, a memory 920, a storage device 930, and an input/output device 940. Each of the components 910, 920, 930, and 940 can be interconnected, for example, using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 can include, for example, a hard disk device, an optical disk device, a storage device that is shared over a network by multiple computing devices (e.g., a cloud storage device), or some other large capacity storage device.

The input/output device 940 provides input/output operations for the system 900. In one implementation, the input/output device 940 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 960. Other implementations, however, can also be used, such as mobile computing devices, mobile communication devices, set-top box television client devices, etc.

Although an example processing system has been described in FIG. 9, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method performed by one or more data processing apparatus, the method comprising:
  providing an input that comprises a provided image to a generative neural network having a plurality of generative neural network parameters, wherein:
    the generative neural network processes the input in accordance with trained values of the plurality of generative neural network parameters to generate an extended image;
    the extended image has (i) more rows, more columns, or both than the provided image, and (ii) is predicted to be an extension of the provided image; and
    the generative neural network has been trained using an adversarial loss objective function;
    training the generative neural network using the adversarial loss objective function comprises processing a training input that comprises a training image using the generative neural network;
    the generative neural network is jointly trained with a discriminative neural network having a plurality of discriminative neural network parameters that is configured to process a given image to generate a discriminative output characterizing a likelihood that the given image was generated using the generative neural network; and
    the discriminative neural network is conditioned on a semantic feature representation of a target image, the training image being a cropped representation of the target image, wherein the semantic feature representation of the target image is provided as either: an additional input to the discriminative neural network; or the discriminative output is determined based at least in part on a similarity measure between the semantic feature representation of a target extended image and an intermediate output of the discriminative neural network, and wherein the semantic feature representation of the target extended image is normalized by a normalization engine prior to using it to condition the discriminative neural network.

2. The method of claim 1, further comprising:
  receiving a request for an image to be presented in a block;
  determining that the provided image is responsive to the request; and
  after generating the extended image, providing the extended image in response to the request.

3. The method of claim 2, further comprising:
  determining that the provided image qualifies for image extension based on a size of the block differing from a size of the provided image, and in response providing the input that comprises the provided image to the generative neural network.

4. The method of claim 3, wherein the size of the block specifies an aspect ratio of the block.

5. The method of claim 2, wherein:
  the request specifies additional elements to be presented with the image in the block; and providing the extended image in response to the request comprises overlaying the additional elements on an extended portion of the extended image.

6. The method of claim 2, wherein the block is to be presented alongside search results or on a third-party webpage.

7. The method of claim 1, wherein the generative neural network comprises a plurality of convolutional neural network layers.

8. The method of claim 1, wherein the generative neural network comprises a plurality of skip connections.

9. The method of claim 1, wherein the generative neural network comprises a plurality of instance normalization layers.

10. The method of claim 1, wherein the input to the generative neural network comprises:
   a baseline image having a same number of rows and columns as the extended image, wherein the baseline image comprises: (i) a first portion that corresponds to the provided image, and (ii) a second portion having default pixel values; and
   a mask image having the same number of rows and columns as the extended image, wherein the mask image identifies the first portion and the second portion of the baseline image.

11. The method of claim 10, wherein: (i) pixels in the mask image corresponding to the first portion of the baseline image each have a first pixel value, and (ii) pixels in the mask image corresponding to the second portion of the baseline image each have a second pixel value that is different than the first pixel value.

12. The method of claim 1, wherein training the generative neural network using the adversarial loss objective function comprises:
   processing a training input that comprises a training image using the generative neural network and in accordance with current values of the generative neural network parameters to generate a training extended image that extends the training image;
   generating a discriminative neural network input based on the training extended image;
   processing the discriminative neural network input using the discriminative neural network and in accordance with current values of the discriminative neural network parameters to generate a discriminative output characterizing a likelihood that the discriminative neural network input was generated using the generative neural network; and
   adjusting the current values of the generative neural network parameters based on the adversarial loss objective function, wherein the adversarial loss objective function depends on the discriminative output characterizing the likelihood that the discriminative neural network input was generated using the generative neural network.

13. The method of claim 12, wherein generating a discriminative neural network input based on the training extended image comprises:
   overwriting a portion of the training extended image corresponding to the training image with the training image.

14. The method of claim 12, further comprising:
   adjusting the current values of the generative neural network parameters based on a reconstruction loss objective function that characterizes a similarity of the training extended image to a target image, wherein the training image is a cropped representation of the target image.

15. A system comprising one or more computers and one or more storage devices storing instructions that when executed by the one or more computers cause the one or more computers to perform operations comprising:
   providing an input that comprises a provided image to a generative neural network having a plurality of generative neural network parameters, wherein:
      the generative neural network processes the input in accordance with trained values of the plurality of generative neural network parameters to generate an extended image;
      the extended image has (i) more rows, more columns, or both than the provided image, and (ii) is predicted to be an extension of the provided image; and
      the generative neural network has been trained using an adversarial loss objective function;
   training the generative neural network using the adversarial loss objective function comprises processing a training input that comprises a training image using the generative neural network;
   the generative neural network is jointly trained with a discriminative neural network having a plurality of discriminative neural network parameters that is configured to process a given image to generate a discriminative output characterizing a likelihood that the given image was generated using the generative neural network; and
   the discriminative neural network is conditioned on a semantic feature representation of a target image, the training image being a cropped representation of the target image, wherein the semantic feature representation of the target image is provided as either: an additional input to the discriminative neural network; or the discriminative output is determined based at least in part on a similarity measure between the semantic feature representation of a target extended image and an intermediate output of the discriminative neural network, and wherein the semantic feature representation of the target extended image is normalized by a normalization engine prior to using it to condition the discriminative neural network.

16. One or more non-transitory computer storage media storing instructions that when executed by one or more computers cause the one or more computers to perform operations comprising:
   providing an input that comprises a provided image to a generative neural network having a plurality of generative neural network parameters, wherein:
      the generative neural network processes the input in accordance with trained values of the plurality of generative neural network parameters to generate an extended image;
      the extended image has (i) more rows, more columns, or both than the provided image, and (ii) is predicted to be an extension of the provided image; and
      the generative neural network has been trained using an adversarial loss objective function;
   training the generative neural network using the adversarial loss objective function comprises processing a training input that comprises a training image using the generative neural network;
   the generative neural network is jointly trained with a discriminative neural network having a plurality of discriminative neural network parameters that is configured to process a given image to generate a discriminative output characterizing a likelihood that the given image was generated using the generative neural network; and the discriminative neural network is conditioned on a semantic feature representation of a target image, the training image being a cropped representation of the target image, wherein the semantic feature representation of the target image is provided as either: an additional input to the discriminative neural network; or the discriminative output is determined based at least in part on a similarity measure between the semantic feature representation of a target extended image and an intermediate output of the discriminative neural network, and wherein the semantic feature representation of the target extended image is normalized by a normalization engine prior to using it to condition the discriminative neural network.

* * * * *